United States Patent
Lynn

(10) Patent No.: US 10,233,584 B1
(45) Date of Patent: *Mar. 19, 2019

(54) SYSTEM FOR SUPPLYING A WATER-OZONE MIXTURE TO A LAUNDRY WASHING MACHINE

(71) Applicant: Daniel W. Lynn, Omaha, NE (US)

(72) Inventor: Daniel W. Lynn, Omaha, NE (US)

(*) Notice: Subject to any disclaimer, the term of this patent is extended or adjusted under 35 U.S.C. 154(b) by 81 days.

This patent is subject to a terminal disclaimer.

(21) Appl. No.: 15/643,947

(22) Filed: Jul. 7, 2017

Related U.S. Application Data

(63) Continuation-in-part of application No. 15/642,794, filed on Jul. 6, 2017, which is a continuation-in-part of application No. 15/446,331, filed on Mar. 1, 2017, which is a continuation-in-part of application No. 15/355,884, filed on Nov. 18, 2016, which is a continuation-in-part of application No. 15/050,777, filed on Feb. 23, 2016.

(60) Provisional application No. 62/121,770, filed on Feb. 27, 2015.

(51) Int. Cl.
| | |
|---|---|
| *C02F 1/00* | (2006.01) |
| *C02F 9/00* | (2006.01) |
| *D06F 35/00* | (2006.01) |
| *C01B 13/11* | (2006.01) |
| *D06F 33/00* | (2006.01) |
| *B01D 29/00* | (2006.01) |
| *B09C 1/00* | (2006.01) |
| *C05F 7/00* | (2006.01) |
| *C05F 9/00* | (2006.01) |
| *F25C 1/00* | (2006.01) |

(52) U.S. Cl.
CPC .......... *D06F 35/001* (2013.01); *C01B 13/115* (2013.01); *D06F 33/00* (2013.01)

(58) Field of Classification Search
CPC ........ A01C 1/04; A61L 2/183; A61L 2202/11; A61M 1/16; B01D 17/0217; B01D 21/305; B01D 29/00; B09C 1/00; B01F 3/04503; B01F 5/04; B01F 5/0413; B01F 5/0428; B01F 2003/04886
USPC ...... 210/85, 87, 90, 96.1, 97, 136, 137, 150, 210/151, 192, 202, 259, 607, 614, 631, 210/724, 739, 741, 743, 746, 750, 760, 210/769
See application file for complete search history.

(56) References Cited

U.S. PATENT DOCUMENTS

| | | | |
|---|---|---|---|
| 6,006,387 A * | 12/1999 | Cooper | A61L 2/202 68/13 R |
| 6,153,105 A | 11/2000 | Tadlock et al. | |
| 6,334,328 B1 | 1/2002 | Brill | |
| 6,685,825 B1 | 2/2004 | Chang | |
| 8,071,526 B2 | 12/2011 | Lynn | |
| 8,075,705 B2 | 12/2011 | Lynn | |
| 9,068,149 B2 | 6/2015 | Lynn | |
| 9,151,528 B2 | 10/2015 | Erbs et al. | |
| 9,174,845 B2 | 11/2015 | Lynn | |
| 9,522,348 B2 | 12/2016 | Lynn | |

(Continued)

*Primary Examiner* — Hayden Brewster
(74) *Attorney, Agent, or Firm* — Dennis Thomte; Thomte Patent Law Office LLC

(57) ABSTRACT

The instant invention relates to a system for supplying a water-ozone mixture or fluid to a large laundry washing machine. The system includes at least two identical boxes with each of the boxes including ozone generators and an injector for supplying the water-ozone fluid to the washing machine.

1 Claim, 4 Drawing Sheets

(56) References Cited

U.S. PATENT DOCUMENTS

| | | |
|---|---|---|
| 2004/0004042 A1 | 1/2004 | Hadley et al. |
| 2004/0168989 A1 | 9/2004 | Tempest, Jr. |
| 2009/0142225 A1 | 6/2009 | Tornqvist |
| 2010/0219137 A1 | 9/2010 | Lacasse |
| 2013/0193081 A1 | 8/2013 | Vasiliu et al. |
| 2014/0033445 A1* | 2/2014 | Daniels .................. D06F 33/02 8/137 |
| 2014/0263097 A1 | 9/2014 | Lynn |
| 2016/0251243 A1 | 9/2016 | Lynn |

* cited by examiner

SYSTEM FOR SUPPLYING A WATER-OZONE MIXTURE TO A LAUNDRY WASHING MACHINE

CROSS-REFERENCE TO RELATED APPLICATIONS

This application is a Continuation-in-Part application of U.S. application Ser. No. 15/642,794 filed Jul. 6, 2017 entitled SYSTEM FOR SUPPLYING A WATER-OZONE MIXTURE TO A LAUNDRY WASHING MACHINE which is a Continuation-in-Part application of U.S. application Ser. No. 15/446,331 filed Mar. 1, 2017 entitled SYSTEMS AND METHODS FOR CREATING AN OXIDATION REDUCTION POTENTIAL (ORP) IN WATER FOR PATHOGENIC CONTROL WITH THE WATER AND OZONE SOLUTIONS THEREOF BEING SUPPLIED TO ONE OR MORE WASH-DOWN STATIONS which is a Continuation-in-Part Application of U.S. application Ser. No. 15/355,884 filed Nov. 18, 2016 entitled SYSTEMS AND METHODS FOR CREATING AN OXIDATION REDUCTION POTENTIAL (ORP) IN WATER FOR PATHOGENIC CONTROL which is a Continuation-in-Part of U.S. application Ser. No. 15/050,777 filed Feb. 23, 2016 entitled SYSTEMS AND METHODS FOR CREATING AN OXIDATION REDUCTION POTENTIAL (ORP) IN WATER FOR PATHOGENIC CONTROL which claims the benefit of U.S. Provisional Application Ser. No. 62/121,770 entitled SYSTEMS AND METHODS FOR CREATING AN OXIDATION REDUCTION POTENTIAL (ORP) IN WATER FOR PATHOGENIC CONTROL, all of which are hereby incorporated by reference thereto to complete this disclosure if necessary.

BACKGROUND OF THE INVENTION

Field of the Invention

This invention relates to improved systems and methods for creating an oxidation reduction potential (ORP) in water for pathogenic control and for other reasons. Even more particularly, this invention relates to a system and method for supplying a water-ozone mixture to a large laundry washing machine. Even more particularly, this invention relates to an improved system wherein the water-ozone mixture is supplied to a laundry washing machine which eliminates the need for the use of hot water and chemicals. Even more particularly, the invention relates to a system wherein the laundry, which is subjected to the water-ozone mixture of this invention, enhances the washing of the material in the washing machine with the washed material requiring less time to dry.

Description of the Related Art

Water intended for potable use (e.g., drinking water), may contain disease-causing organisms, or pathogens, which can originate from the source of the water, from resistance to water treatment techniques, from improper or ineffectual water treatment techniques, or so forth. Pathogens include various types of bacteria, viruses, protozoan parasites, and other organisms. To protect drinking water from disease-causing organisms, or pathogens, water suppliers often add a disinfectant, such as chlorine, to the water. However, disinfection practices can be ineffectual because certain microbial pathogens, such as Cryptosporidium, are highly resistant to traditional disinfection practices. Also, disinfectants themselves can react with naturally-occurring materials in the water to form byproducts, such as trihalomethanes and haloacetic acids, which may pose health risks.

A major challenge for water suppliers is how to control and limit the risks from pathogens and disinfection byproducts. It is important to provide protection from pathogens while simultaneously minimizing health risks to the population from disinfection byproducts. Oxidation reduction potential (ORP) can be used for water system monitoring to reflect the antimicrobial potential of the water, without regard to the water quality, with the benefit of a single-value measure of the disinfection potential, showing the activity of the disinfectant rather than the applied dose. The prior art does not provide systems and methods for providing an ozone-water mixture to large laundry washing machines.

The co-pending applications represent improvements in the art. The instant application represents a further improvement in the art in that the instant invention provides a system for supplying an ozone-water mixture to a large laundry washing machine. Large laundry washing machines, such as found in nursing homes, etc., utilize cold water and sometimes hot water as well as chemicals in an effort to cleanse the materials being laundered, such as bed sheets, pillow cases, pads, etc. The use of hot water in the washing machine and the use of chemicals in the washing machine increases the cost of laundering the materials in the washing machine. Further, the laundered materials require extensive drying.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is provided for creating an oxidation reduction potential (ORP) in water for supply to a large laundry washing machine. The apparatus is provided for supplying the water-ozone fluid to the washing machine. The apparatus includes a first box having an injector therein. The injector in the first box includes a water inlet, an ozone inlet, and a water-ozone outlet. The water inlet of the injector in the first box is in fluid communication with a source of water under pressure. A first ozone generator is positioned in the first box. A second ozone generator is also positioned in the first box. A third ozone generator is also positions in the first box. Each of the first, second and third ozone generators in the first box has an inlet end and an outlet end. The first ozone generator in the first box has its inlet end connected to a source of dried air. The outlet end of the first ozone generator in the first box is fluidly connected to the inlet end of the second ozone generator in the first box. The outlet end of the second ozone generator in the first box is operatively fluidly connected to the inlet end of the third ozone generator. The outlet end of the third ozone generator is connected to the ozone inlet of the injector in the first box. A water-ozone line extends from the water-ozone outlet of the first injector in the first box to the first fluid inlet of the laundry washing machine.

The apparatus also includes a second box which has an injector therein. The injector in the second box has a water inlet, an ozone inlet, and a water-ozone outlet. The water inlet of the injector in the second box is in fluid communication with a source of water under pressure. A first ozone generator is positioned in the second box. A second ozone generator is also positioned in the second box. A third ozone generator is also positioned in the second box. Each of the first, second and third ozone generators in the second box have an inlet end and an outlet end. The first ozone generator in the second box has its inlet end connected to a source of dried air. The outlet end of the first ozone generator in the second box is connected to the inlet end of the second ozone generator in the second box. The outlet end of the second ozone generator in the second box is operatively fluidly connected to the inlet end of the third ozone generator in the second box. The outlet end of the third ozone generator is connected to the ozone inlet of the injector in the second box. A water-ozone line extends from the water-ozone outlet of the injector in the second box. A water-ozone line extends from the water-ozone outlet of the injector in the second box to the second water inlet of the washing machine.

It is therefore a principal object of the invention to provide an apparatus for supplying a water-ozone fluid to a large laundry washing machine.

A further object of the invention is to provide a system for supplying a water-ozone fluid to a large laundry washing machine which eliminates the need of hot water and chemicals during the washing process.

A further object of the invention is to provide a system of the type described which greatly enhances the ability of the washing machine to launder the materials therein and which reduces the time needed to dry the laundered material.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
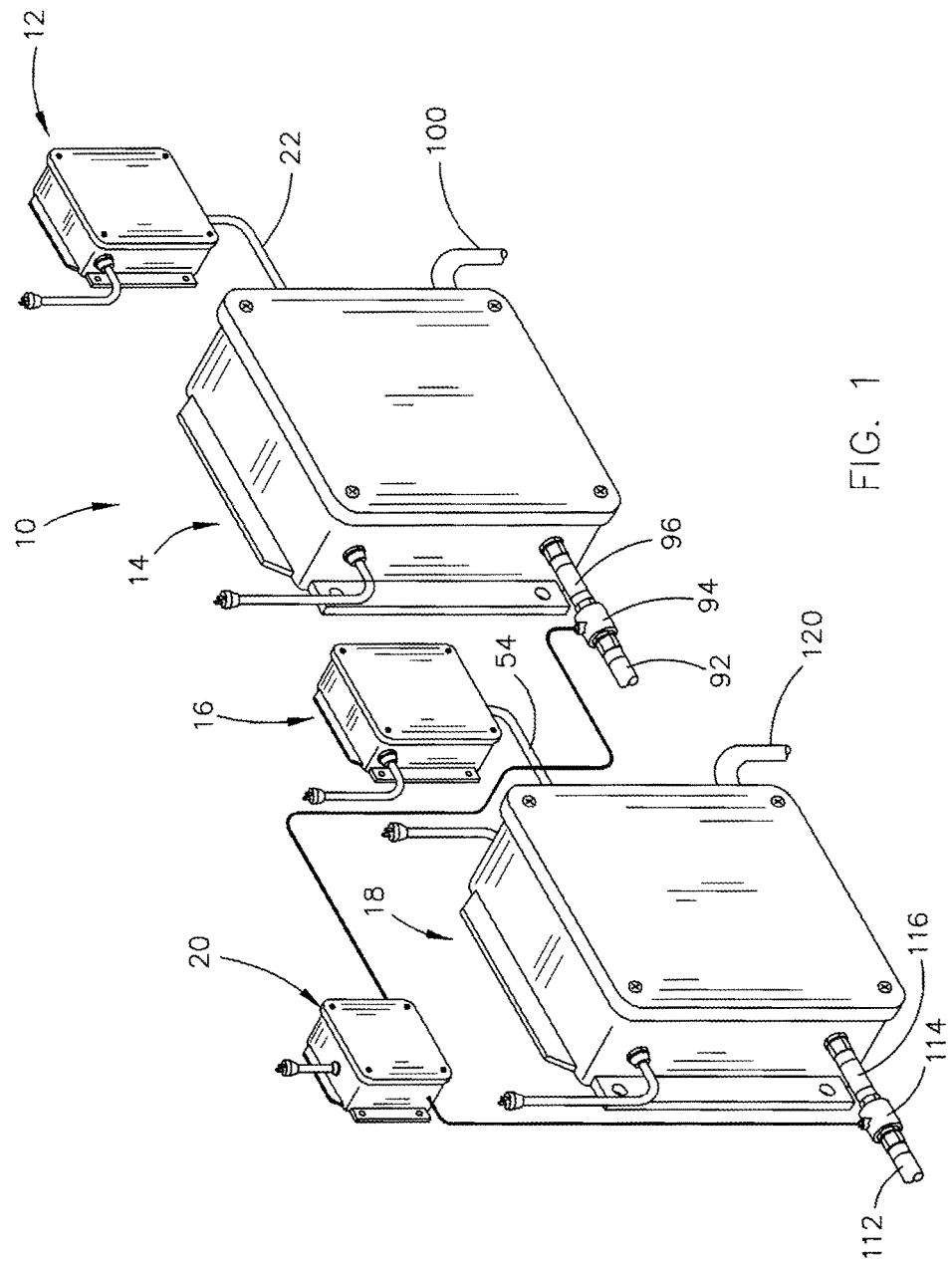
FIG. 1 is a perspective view of the apparatus of this invention.
Figure 2:
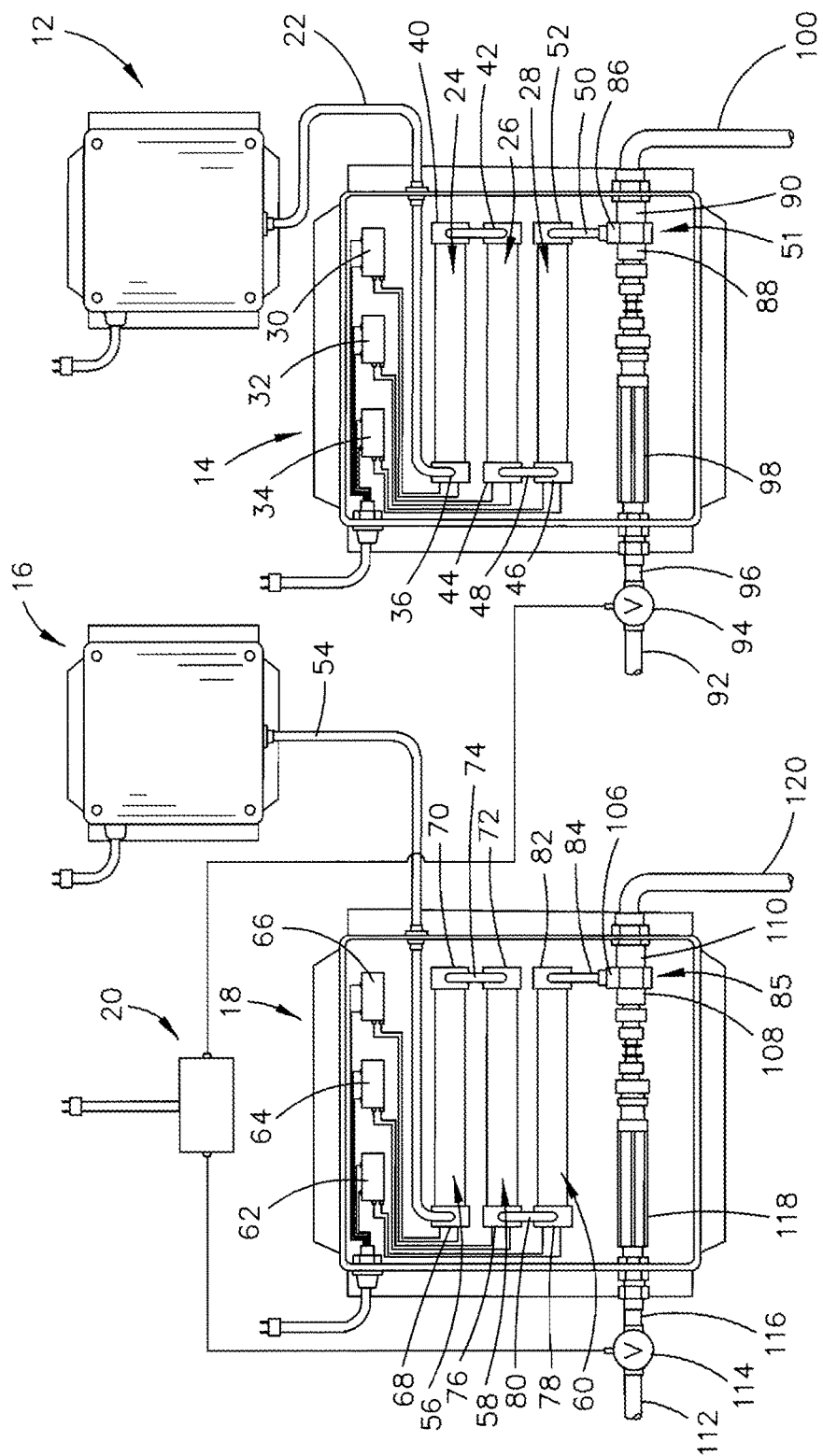
FIG. 2 is a plan view of the apparatus of this invention with the covers of the first and second boxes being removed.
Figure 3:
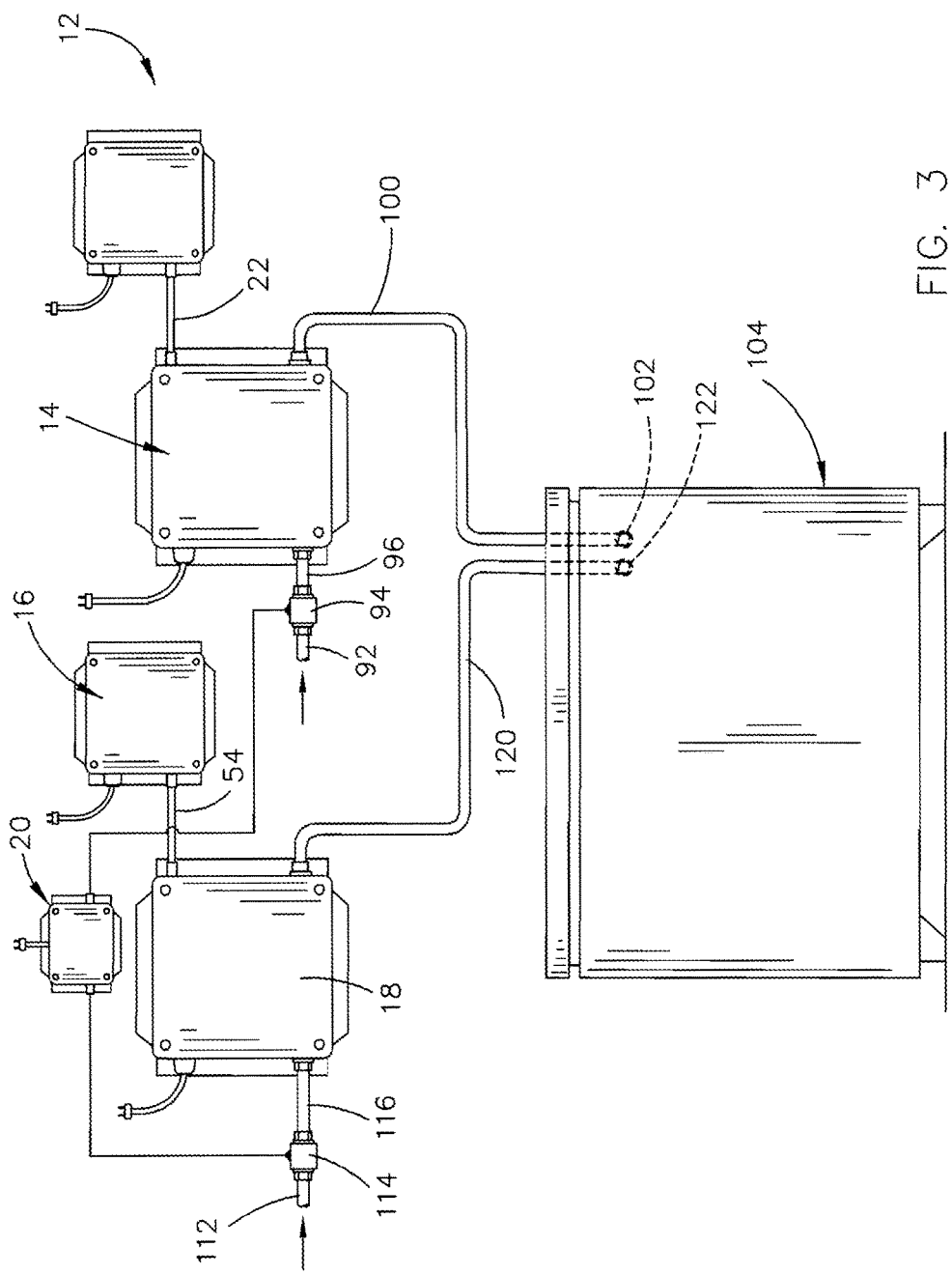
FIG. 3 is a schematic of the apparatus of this invention.
Figure 4:
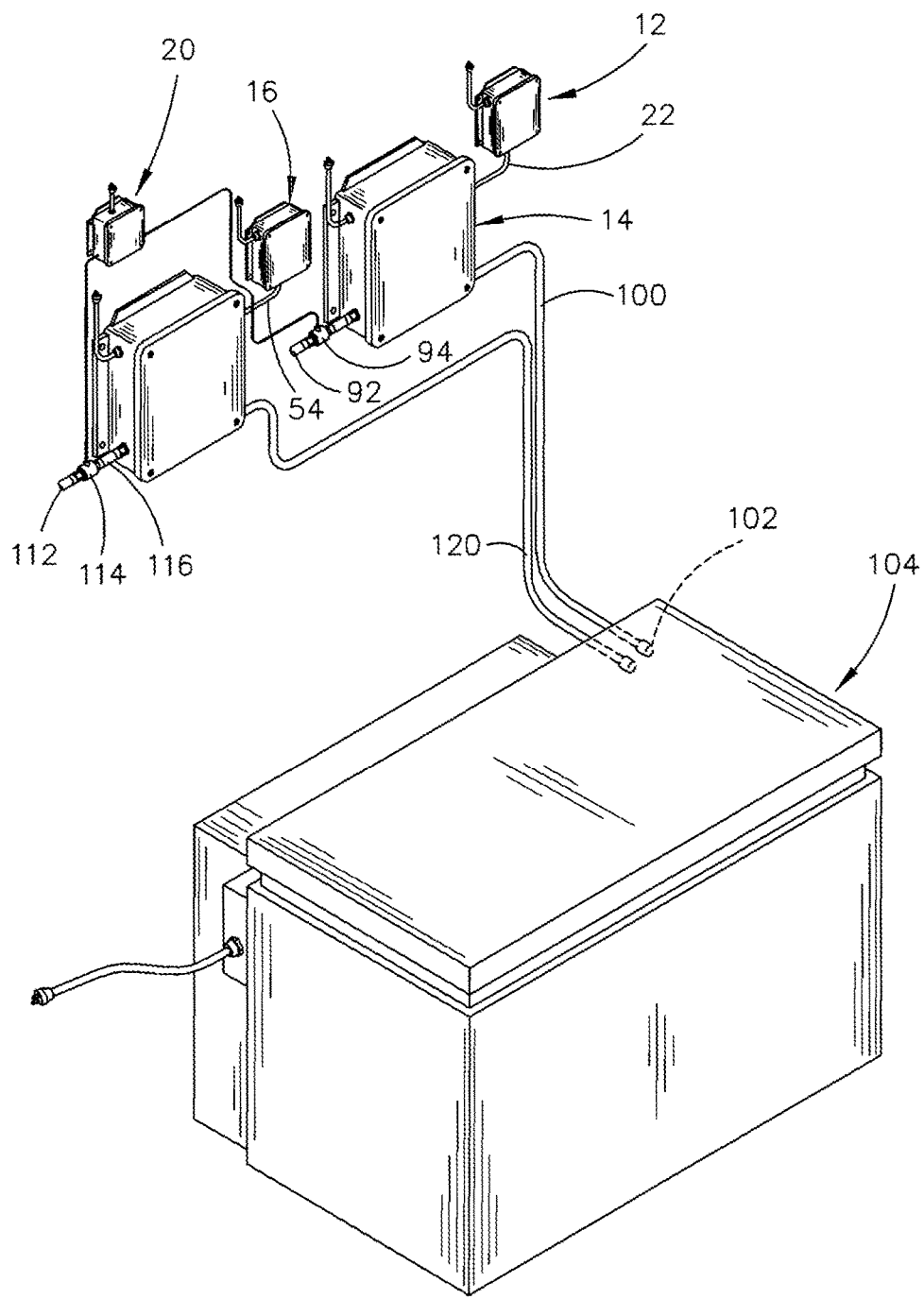
FIG. 4 is a perspective view of the apparatus of this invention.

The apparatus or system of this invention is designated with the reference numeral 10. Apparatus 10 includes a first air dryer 12, a first box 14, a second air dryer 16, a second box 18 and a control box 20. Although boxes 14 and 18 are identical, the components of the boxes 14 and 18 will be described in detail. Air line 22 extends from air dryer 12 into box 14 as illustrated in FIG. 2. Ozone generators 24, 26 and 28 are positioned in box 14 and are electrically operated in conventional fashion by transformers 30, 32 and 34 respectively which are connected to a source of electrical power in conventional fashion.

The outer end of air tube 22 is connected to the air inlet end 36 of ozone generator 24. The ozone outlet end 40 of ozone generator 24 is connected to the ozone inlet end 42 of ozone generator 26 by a tube 44. The ozone outlet end 44 of ozone generator 26 is connected to the ozone inlet end 46 of ozone generator 28 by tube 48. An ozone tube 50 extends from the ozone outlet end 52 to an injector 51 as will be explained in more detail hereinafter. An air line 54 extends from air dryer 16 into box 18 as illustrated in FIG. 2. Ozone generators 56, 58 and 60 are also positioned in box 18 and are electrically operated in conventional fashion by transformers 62, 64 and 66 respectively which are connected to a source of electrical power in conventional fashion.

The outer end of air tube 54 is connected to the air inlet end 68 of ozone generator 56. The ozone outlet end 70 of ozone generator 56 is connected to the ozone inlet end 72 of ozone generator 58 by tube 74. The ozone outlet end 76 of ozone generator 58 is connected to the ozone inlet end 78 of ozone generator 60 by tube 80. The ozone outlet end 82 of ozone generator 60 has a tube 84 extending therefrom to an injector 85 as will be described in more detail hereinafter.

Injector 51 includes an ozone inlet 86, a water inlet 88 and a water-ozone outlet. Water inlet 88 of injector 51 is in fluid communication with a source of water under pressure by way of tube 92 and valve 94. Valve 94 is electrically controlled by the control box 20. Line 96 extends from valve 94 to the water inlet 88 of injector 51. An optional electrically controlled valve 98 may be imposed in line 96 if so desired. If valve 98 is imposed in line 96, the valve 94 may not be utilized. A water-ozone line 100 extends from water-ozone outlet 90 of injector 51 to the inlet 102 of washing machine 104.

Injector 85 includes an ozone inlet 106, a water inlet 108 and a water-ozone outlet 110. Water inlet 108 is in fluid communication with a source of water under pressure by way of tube 112 and valve 114. Line 116 extends form valve 114 to the water inlet 108 of injector 85. An optional electrically controlled valve 118 may be imposed in line 116 if so desired. If valve 118 is imposed in line 116, the valve 114 may not be utilized. A water-ozone line 120 extends from water-ozone outlet 110 of injector 85 to the inlet 122 of washing machine 104.

In operation, dried air from air dryer 12 is supplied to the inlet end 36 of ozone generator 24. The ozone generated by ozone generator 24 is passed from the ozone outlet end 40 of ozone generator 24 to the ozone inlet end 42 of ozone generator 26. The ozone generated by the ozone generators 24 and 26 is passed from the ozone outlet end 44 of ozone generator 26 to the ozone inlet end 46 of ozone generator 28. The ozone generated by the ozone generators 24, 26 and 28 is passed outwardly from the ozone outlet end 52 of ozone generator 28 to the ozone inlet 86 of injector 51. The suction generated by the water passing through the injector 51 draws or sucks the ozone from the ozone generators 24, 26 and 28 into the water passing through the injector 51. The water-ozone mixture or fluid is fed to the inlet 102 of machine 104 by the way of tube 100.

To ensure that sufficient ozone and water is supplied to washing machine 104, the second box 18 is utilized. If needed, more than two boxes could be utilized.

The operation of box 18 will now be described. Dried air from air dryer 16 is supplied to the inlet end 68 of ozone generator 56. The ozone generated by ozone generator 56 is passed from the ozone outlet end 70 of ozone generator 56 to the ozone inlet end 72 of ozone generator 58. The ozone generated by the ozone generators 56 and 58 is passed from the ozone outlet end 76 of ozone generator 58 to the ozone inlet end 78 of ozone generator 60. The ozone generated by the ozone generators 56, 58 and 60 is passed outwardly from the ozone outlet end 82 of ozone generator 60 to the ozone inlet 106 of injector 85. The suction generated by the water passing through the injector 85 draws or sucks the ozone from the ozone generators 56, 58 and 60 into the water passing through the injector 85. The water-ozone mixture or fluid is fed to inlet 122 of machine 104.

The ozone-water fluid or mixture supplied to the machine 104 by the lines 100 and 120 provides sufficient ozone and water to the machine 104 which results in the material to be washed in a more efficient way without the use of chemicals or hot water. It has been found that the material being laundered into machine 104 will require much less time to dry.

Although it is described that each of the boxes 14 and 18 have three ozone generators, each of the boxes 14 and 18 could have two ozone generators positioned therein or more than three ozone generators positioned therein.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
   a laundry washing machine having a first water inlet and a second water inlet;
   an apparatus for supplying a water-ozone fluid to said laundry washing machine, comprising:
   a first box;
   a first injector in said first box with said first injector in said first box having a water inlet, an ozone inlet and a water-ozone outlet;
   a first water tube extending from a source of water under pressure to said water inlet of said first injector in said first box;
   an electrically controlled first valve imposed in said first water tube;
   a control electrically connected to said first valve imposed in said first water tube;
   a first ozone generator positioned in said first box;
   said first ozone generator in said first box having an air inlet and an ozone outlet;
   a second ozone generator positioned in said first box;
   said second ozone generator in said first box having an ozone inlet and an ozone outlet;
   a third ozone generator positioned in said first box;
   said third ozone generator in said first box having an ozone inlet and an ozone outlet;
   a first source of dried air positioned outwardly of said first box;
   an air tube extending from said first source of dried air to said air inlet of said first ozone generator in said first box;
   an ozone tube extending between said ozone outlet of said first ozone generator in said first box and said ozone inlet of said second ozone generator in said first box;
   an ozone tube extending between said ozone outlet of said second ozone generator in said first box and said ozone inlet of said third ozone generator in said first box;
   an ozone tube extending between said ozone outlet of said third ozone generator in said first box and said ozone inlet of said injector in said first box;
   a water-ozone line extending from said water-ozone outlet of said injector in said first box to said first water inlet of said laundry washing machine;
   a second box spaced from said first box;
   a first injector in said second box;
   said first injector in said second box having a water inlet, an ozone inlet, and a water-ozone outlet;
   a second water tube extending from a source of water under pressure to said water inlet of said first injector in said second box;
   an electrically controlled second valve imposed in said second water tube;
   said control being electrically connected to said second valve imposed in said second water tube;
   a first ozone generator positioned in said second box;
   said first ozone generator in said second box having an air inlet and an ozone outlet;
   a second ozone generator positioned in said second box;
   said second ozone generator in said second box having an ozone inlet and an ozone outlet;
   a third ozone generator positioned in said second box;
   said third ozone generator in said second box having an ozone inlet and an ozone outlet;
   a second source of dried air positioned outwardly of said second box;
   an air tube extending from said second source of dried air to said air inlet of said first ozone generator in said second box;
   an ozone tube extending between said ozone outlet of said first ozone generator in said second box and said ozone inlet of said second ozone generator in said second box;
   an ozone tube extending between said ozone outlet of said second ozone generator in said second box and said ozone inlet of said third ozone generator in said second box;
   an ozone tube extending between said ozone outlet of said third ozone generator in said second box and said ozone inlet of said first injector in said second box; and
   a water-ozone line extending from said water-ozone outlet of said first injector in said second box to said second water inlet of said laundry washing machine.

\* \* \* \* \*